(12) United States Patent
Twelves, Jr. et al.

(10) Patent No.: US 10,092,975 B2
(45) Date of Patent: Oct. 9, 2018

(54) SOLID STATE ADDITIVE MANUFACTURING SYSTEM

(75) Inventors: Wendell V. Twelves, Jr., Glastonbury, CT (US); Wangen Lin, South Glastonbury, CT (US); David G. Alexander, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 1719 days.

(21) Appl. No.: 12/069,714

(22) Filed: Feb. 12, 2008

(65) Prior Publication Data

US 2009/0200275 A1 Aug. 13, 2009

(51) Int. Cl.
| | |
|---|---|
| *B23K 20/12* | (2006.01) |
| *B23K 26/34* | (2014.01) |
| *B01J 19/08* | (2006.01) |
| *B23K 9/04* | (2006.01) |
| *B33Y 30/00* | (2015.01) |
| *B23K 101/00* | (2006.01) |

(52) U.S. Cl.
CPC .......... *B23K 20/1215* (2013.01); *B33Y 30/00* (2014.12); *B23K 2201/001* (2013.01)

(58) Field of Classification Search
CPC .. B23K 20/1255; B23K 20/128; B23K 11/11; B23K 20/10; B23K 20/1215; B23K 2201/001; B23K 20/122–20/1285; B33Y 30/00; B33Y 40/00
USPC ............. 219/76.1; 228/112.1, 2.1, 2.3, 114.5
See application file for complete search history.

(56) References Cited

U.S. PATENT DOCUMENTS

| | | | | |
|---|---|---|---|---|
| 4,165,212 A | * | 8/1979 | Ziegler | B29C 47/54 425/382 R |
| 4,556,775 A | * | 12/1985 | Inoue | 219/76.13 |
| 5,262,123 A | | 11/1993 | Thomas et al. | |
| 5,697,544 A | * | 12/1997 | Wykes | 228/2.1 |
| 5,713,507 A | | 2/1998 | Holt et al. | |
| 6,457,629 B1 | * | 10/2002 | White | 228/112.1 |
| 6,533,974 B1 | * | 3/2003 | Hartman | B29C 47/24 264/293 |
| 6,553,974 B1 | | 4/2003 | Wickman et al. | |
| 6,572,007 B1 | * | 6/2003 | Stevenson et al. | 228/112.1 |
| 6,726,084 B2 | * | 4/2004 | Duncan, Jr. | 228/112.1 |

(Continued)

FOREIGN PATENT DOCUMENTS

| | | |
|---|---|---|
| EP | 1872893 A1 | 1/2008 |
| FR | 2672831 A1 | 8/1992 |

OTHER PUBLICATIONS

European opposition for European patent Apln. No. EP09250262.4 dated Mar. 12, 2018.

*Primary Examiner* — Tu B Hoang
*Assistant Examiner* — Diallo I Duniver
(74) *Attorney, Agent, or Firm* — Bachman & LaPointe, PC

(57) ABSTRACT

A process for solid state deposition of a material onto a workpiece includes the steps of providing a rod of metallic deposition material, exerting pressure at one end of the rod to move the metallic deposition material into a deposition zone, rotating the rod while the pressure is being exerted to generate frictional heat when the rod contacts a surface of the workpiece, and raising the temperature of the metallic deposition material to reduce the amount of frictional heat which needs to be generated during the rotating step and to produce a microstructure which is substantially free of porosity and which has a fine grain size.

13 Claims, 1 Drawing Sheet

(56) References Cited

U.S. PATENT DOCUMENTS

| | | | |
|---|---|---|---|
| 6,776,328 B2* | 8/2004 | Rice et al. | 228/112.1 |
| 6,811,632 B2* | 11/2004 | Nelson et al. | 156/73.5 |
| 6,814,823 B1* | 11/2004 | White | 156/73.1 |
| 6,913,186 B2* | 7/2005 | Vyas | 228/112.1 |
| 6,926,970 B2* | 8/2005 | James et al. | 428/615 |
| 7,156,277 B2* | 1/2007 | Ishikawa et al. | 228/2.1 |
| 7,225,966 B2* | 6/2007 | Christner | 228/112.1 |
| 7,654,435 B2 | 2/2010 | Kumagai et al. | |
| 2002/0027155 A1* | 3/2002 | Okamura et al. | 228/112.1 |
| 2003/0042292 A1* | 3/2003 | Hatten et al. | 228/112.1 |
| 2004/0046003 A1* | 3/2004 | Vyas | B23K 20/123 228/112.1 |
| 2005/0150871 A1* | 7/2005 | Offer | 219/76.17 |
| 2006/0102689 A1* | 5/2006 | Trapp et al. | 228/2.1 |
| 2006/0163328 A1* | 7/2006 | Subramanian et al. | 228/112.1 |
| 2006/0263328 A1 | 11/2006 | Van et al. | |
| 2007/0040006 A1* | 2/2007 | Charles R. et al. | 228/112.1 |
| 2007/0080191 A1* | 4/2007 | Dos Santos et al. | 228/101 |
| 2007/0241167 A1* | 10/2007 | Gendou et al. | 228/101 |
| 2008/0099533 A1* | 5/2008 | Hanlon et al. | 228/112.1 |

* cited by examiner

SOLID STATE ADDITIVE MANUFACTURING SYSTEM

BACKGROUND

The present disclosure relates to a system and a process for depositing a metallic material on a substrate.

Additive manufacturing processes are able to deposit metallic materials to add features on existing work pieces for repair operations and to create near net shape work pieces through solid free form fabrication. The current additive manufacturing systems employ a variety of technologies including lasers, electron beams, wire feed stock, powder delivery systems, and powder beds. These systems all share the common characteristic of a molten melt pool to effect deposition of new material on a substrate. The microstructure of a weld deposited metal mass frequently has inherent defects in the form of thermally induced residual stress, fusion bond line flaws, micro cracking, and epitaxial growth of grains. The material properties of such weld deposited metal mass nominally exceed those of castings, but typically fall short of wrought material.

SUMMARY

There is described herein an additive manufacturing process and system which overcomes the material properties limitations inherent in melt pool deposition processes.

In accordance with the present disclosure, there is described a system for depositing material onto a workpiece. The system broadly comprises a rod of metallic deposition material, means for exerting pressure at one end of said rod to move said metallic deposition material into a deposition zone, means for rotating said rod while said pressure is being exerted to generate frictional heat when said rod contacts a surface of said workpiece, and means for raising the temperature of the metallic deposition material.

Further in accordance with the present disclosure, there is described a process for depositing material onto a workpiece. The process broadly comprises the steps of providing a rod of metallic deposition material, exerting pressure at one end of said rod to move said metallic deposition material into a deposition zone, rotating said rod while said pressure is being exerted to generate frictional heat when said rod contacts a surface of said workpiece, and raising the temperature of said metallic deposition material while an end of said rod is in said deposition zone.

Other details of the solid state additive manufacturing system, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The deposition process and system described herein performs deposition of metallic material in a solid plastic state. This results in defect free material with a grain structure that will provide full wrought properties following heat treatment.

Instead of a non-consumable rotating friction pin used in stir welding processes, the process and system described herein use a consumable rotating rod of metallic material. The consumable, rotating rod of metallic material can be progressively fed into the workpiece or substrate, which may comprise a part or a turbine engine component undergoing repair. This can be done using a pneumatic, hydraulic or mechanical feed mechanism. Localized heat may be added to the rod stock just above the deposition point. The heat may be added using an induction coil, a laser, acetylene torch flame, etc. The temperature of the metallic material forming the rod may be raised to reduce the amount of heat needed to be produced by friction. By preheating the deposition rod to a near plastic state, the energy needed to spin the rod to generate frictional heat and the vertical force of the rod on the work piece may be reduced to a practical level.

Lateral confinement of the deposited metal may be progressively achieved by shaped cam followers spaced at a desired wall thickness. Upper confinement of the deposited metal may be provided by the solid feed rod. The lower surface confinement may be provided by the substrate. Recently deposited material will provide the aft confinement. The forward face of the deposition zone is unconfined and may be characterized by a bow wave of plastic material.

The plastic nature of the metallic material in the deposition zone along with the stirring motion insures that the microstructure will be substantially free of porosity and have a fine grain size.

Figure 1:
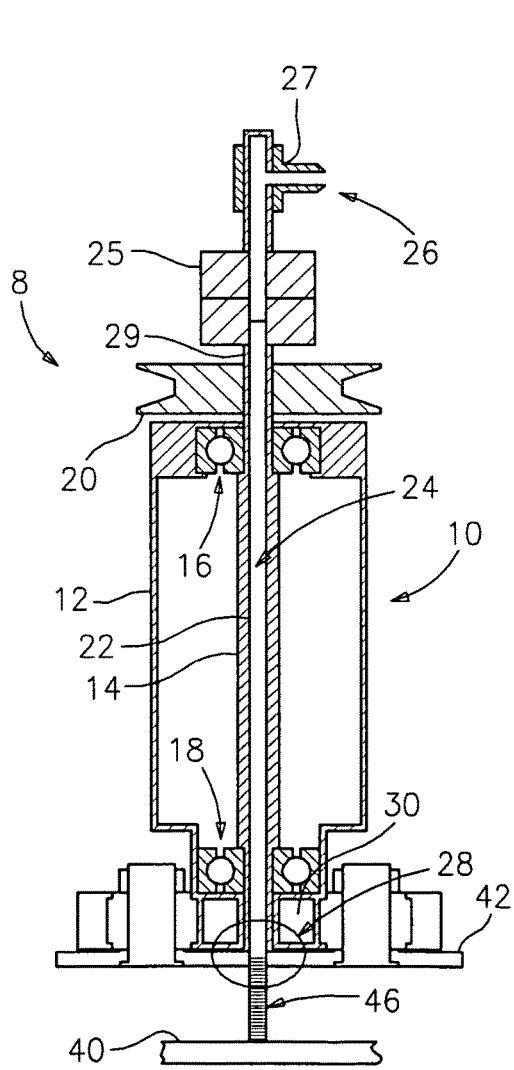
FIG. 1 is a sectional view of a solid state additive deposition system.

Referring now to the drawings, FIG. 1 illustrates a solid state deposition system 8 which includes a spindle 10. The spindle 10 has a housing 12 which may be formed from any suitable material. Located within the housing 12 is a rotatable hollow shaft 14 supported for rotation by bearings 16 and 18. Attached to the shaft 14 may be a drive pulley 20 or other suitable device for rotating the shaft. When used, the drive pulley 20 may be connected to a motor (not shown) via a belt or chain (not shown) for rotating the pulley 20 and thus, the shaft 14.

Positioned within the core 22 of the hollow shaft 14 is a solid feed rod 24 of consumable metallic deposition material. Suitable materials for the feed rod 24 include: Aerospace Grades of Aluminum, Titanium, Low Alloy Steel and Nickel Based Super Alloys such as Inconel 625 and 718. Attached to the upper end 29 of the shaft 14 is a feed mechanism 26 for exerting pressure on an upper end of the feed rod 24 and for thus feeding the consumable deposition material into the deposition zone 28. In one embodiment, the feed mechanism 26 may comprise a fitting 27 for introducing a high pressure fluid, such as air, into the hollow core 22 of the shaft 14 and into contact with the upper end of the solid feed rod 24. A rotating pressure union 25 may be provided to join the fitting 27 to the upper end 29 of the shaft 14. The high pressure fluid may be used to feed the consumable deposition material in the rod 24 into the deposition zone 28.

As an alternative to the fitting 27 and the use of high pressure air to feed the deposition material into the deposition zone 28, the feed mechanism 26 may comprise a hydraulic or mechanical feed mechanism positioned adjacent the upper end 29 of the shaft 14 to apply a pressure force to the upper end of the solid feed rod 24. The hydraulic or mechanical feed mechanism may be any suitable device.

A heating element 30 may be positioned adjacent the deposition zone 28 at a location just above the deposition point 31. The heating element 30 may be positioned within the housing 12 or external to the housing 12. The heating element 30 may be an induction coil, a laser, or an acetylene torch flame. The heating element 30 may be used to raise the temperature of the metallic deposition material forming the rod 24 to approximately 0.8 of the deposition material melt temperature. The temperature of the material forming the rod 24 is raised to reduce the amount of heat needed to be produced by friction. By preheating the feed rod 24 in this manner to a near plastic state, the energy needed to spin the feed rod 24 to generate frictional heat and the vertical force of the rod on a workpiece 40 is reduced to a practical level. By heating the material forming the feed rod 24 and applying pressure at the opposite end by the feed mechanism 26, metal may be deposited on a surface of the workpiece 40 for a desired purpose such as effecting a repair.

Figure 2:
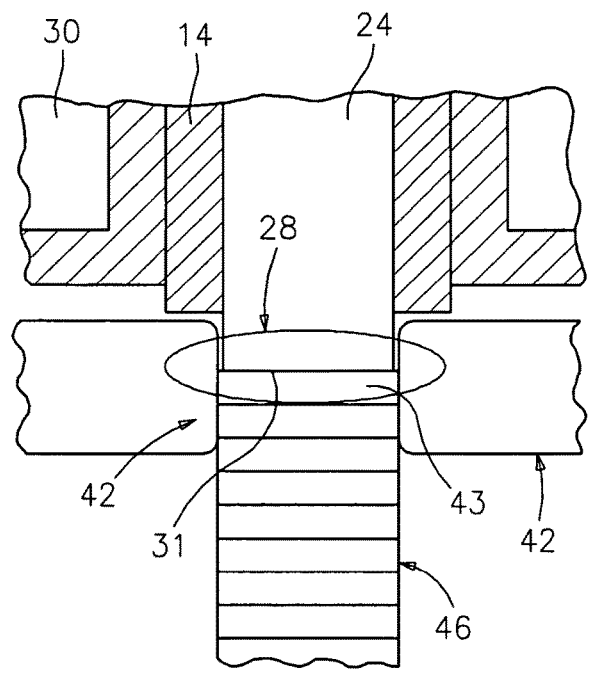
FIG. 2 is an enlarged view of the deposition zone formed by the system of FIG. 1

As shown in FIG. 2, lateral confinement of the deposited metal may be progressively achieved by shaped cam followers 42 spaced at a desired wall thickness for the deposited material. The shaped cam followers 42 may be conical rollers whose outer diameter surface insures that the rollers only contact relatively soft material 43 in the current deposition layer. Upper confinement of the deposited metal may be provided by the solid feed rod 24. The substrate or target plate 40 provides lower confinement. Aft confinement is provided by the recently deposited material.

As can be seen from FIG. 2, metallic material may be deposited in layers 46 on a surface of the workpiece 40. The forward face of the deposition zone may be unconfined and may be characterized by a bow wave of plastic deposition material. The plastic state of the deposited material in the deposition zone, along with the stirring motion caused by rotation of the feed rod 24, leads to the microstructure being substantially free of porosity and having a fine grain size. The porosity and grain size are equivalent to what is seen in a forging for any given material.

The process of the present invention may be used to add features to bosses, flanges and stiffening blades to a diffuser case. The process described herein may also be used to free form fabricate diffuser cases, turbine exhaust cases, and intermediate cases.

The solid state additive manufacturing system and process disclosed herein overcomes the material properties limitations inherent in melt pool deposition processes. The approach described herein enables full wrought properties to be realized directly from an additive manufacturing process.

It is apparent that there has been provided in accordance with the present disclosure a solid state additive manufacturing system which fully satisfies the objects, means, and advantages set forth hereinbefore. While the present disclosure has set forth particular embodiments, other alternatives, modifications, and variations may become apparent to those skilled in the art having read the foregoing description. Accordingly, it is intended to embrace those alternatives, modifications, and variations as fall within the broad scope of the appended claims.

What is claimed is:

1. A system for depositing material onto a workpiece, said system comprising:
   a housing;
   a rod of consumable metallic deposition material;
   means for exerting pressure at an upper end of said rod to move said metallic deposition material into a deposition zone;
   means for rotating said rod while said pressure is being exerted to generate frictional heat when said rod contacts a surface of said workpiece;
   said rotating means comprising a hollow rotatable shaft located within said housing;
   said rod being positioned within said hollow rotatable shaft;
   means for raising the temperature of said rod of consumable metallic deposition material above the deposition zone;
   said pressure exerting means comprising a feed mechanism attached to an upper end of said hollow rotatable shaft, wherein said feed mechanism comprises a fitting for feeding a high pressure fluid into an upper end of said hollow rotatable shaft to apply pressure to the upper end of the rod within said hollow rotatable shaft and move the metallic deposition material of the rod into the deposition zone, and
   means for laterally confining the deposited metal being deposited on said surface of said workpiece in said deposition zone, wherein said lateral confining means comprises shaped cam followers comprising rollers having an outer diameter surface configured to contact said deposition material in said deposition zone, said deposition zone comprising an area located between said cam followers and below said hollow rotatable shaft.

2. The system according to claim 1, wherein said rod comprises a solid rod of consumable deposition material.

3. The system of claim 1, wherein said temperature raising means comprises a source of heat located adjacent said deposition zone.

4. The system according to claim 3, wherein said heat source is an induction coil.

5. The system according to claim 3, wherein said heat source is a laser.

6. The system according to claim 3, wherein said heat source is an acetylene torch flame.

7. A process for depositing a material onto a workpiece using a solid state process comprising the steps of:
   providing a housing and a rotatable hollow shaft located within said housing;
   positioning a rod of consumable metallic deposition material within said rotatable hollow shaft;
   exerting pressure at an upper end of said rod to move said metallic deposition material into a deposition zone;
   said pressure exerting step comprising providing a feed mechanism attached to an upper end of said shaft and using said feed mechanism to exert said pressure to an end of said rod, wherein said feed mechanism comprises a fitting for feeding a high pressure fluid into an upper end of said rotatable hollow shaft to apply pressure to the upper end of the rod within said rotatable hollow shaft and move the metallic deposition material into the deposition zone;
   rotating said rotatable hollow shaft so as to rotate said rod while said pressure is being exerted to generate frictional heat when said rod contacts a surface of said workpiece;
   preheating said rod of consumable metallic deposition material above the deposition zone while an end of said rod is in said deposition zone, and
   laterally confining the deposited metal being deposited in said deposition zone on said surface of said workpiece, wherein said laterally confining step comprises using shaped cam followers comprising rollers having an outer diameter surface configured to contact the deposition material in said deposition zone, said deposition zone comprising an area located between said cam followers and below said rotatable hollow shaft.

8. The process according to claim 7, wherein said rod positioning step comprises providing a solid rod of consumable deposition material.

9. The process of claim 7, wherein said preheating step comprises providing a source of heat located adjacent said deposition zone and heating said deposition material adjacent a deposition point so as to reduce the frictional heat which needs to be generated during said rotating step.

10. The process according to claim 9, wherein said heat source providing step comprises providing an induction coil.

11. The process according to claim 9, wherein said heat source providing step comprises providing a laser.

12. The process according to claim 9, wherein said heat source providing step comprises providing an acetylene torch flame.

13. A process for depositing a material onto a workpiece using a solid state process comprising the steps of:
providing a housing and positioning a rotatable hollow shaft within said housing;
providing a rod of consumable metallic deposition material within said rotatable hollow shaft;
exerting pressure at an upper end of said rod to move said metallic deposition material into a deposition zone;
said pressure exerting step comprising providing a feed mechanism attached to an upper end of said rotatable hollow shaft and using said feed mechanism to exert said pressure to the upper end of said rod, wherein said feed mechanism comprises a fitting for feeding a high pressure fluid into an upper end of said rotatable hollow shaft to apply pressure to the upper end of the rod within said rotatable hollow shaft and move the metallic deposition material of the rod into the deposition zone;
rotating said rotatable hollow shaft so as to rotate said rod while said pressure is being exerted to generate frictional heat when said rod contacts said workpiece;
preheating said rod of consumable metallic deposition material above the deposition zone to reduce the amount of frictional heat needed to be generated during said rotating step so as to form a microstructure in the deposited material which is substantially free of porosity and which has a fine grain size; and
laterally confining the deposited metal being deposited in said deposition zone on said surface of said workpiece, wherein said laterally confining step comprises using shaped cam followers comprising rollers having an outer diameter surface configured to contact the deposition material in said deposition zone, said deposition zone comprising an area located between said cam followers and below said rotatable hollow shaft.

* * * * *